(12) United States Patent
Kim et al.

(10) Patent No.: US 8,185,769 B2
(45) Date of Patent: May 22, 2012

(54) METHOD FOR ENSURING SYNCHRONOUS PRESENTATION OF ADDITIONAL DATA WITH AUDIO DATA

(75) Inventors: Hyung Sun Kim, Seoul (KR); Kang Soo Seo, Kyunggi-do (KR); Byung Jin Kim, Kyunggi-do (KR); Soung Hyun Um, Anyang-si (KR)

(73) Assignee: LG Electronics Inc., Seoul (KR)

( * ) Notice: Subject to any disclaimer, the term of this patent is extended or adjusted under 35 U.S.C. 154(b) by 208 days.

(21) Appl. No.: 12/557,744

(22) Filed: Sep. 11, 2009

(65) Prior Publication Data

US 2010/0003013 A1 Jan. 7, 2010

Related U.S. Application Data

(63) Continuation of application No. 11/924,656, filed on Oct. 26, 2007, now Pat. No. 7,793,131, which is a continuation of application No. 11/593,082, filed on Nov. 6, 2006, now Pat. No. 7,293,189, which is a continuation of application No. 10/305,020, filed on Nov. 27, 2002, now Pat. No. 7,181,636.

(30) Foreign Application Priority Data

Nov. 27, 2001 (KR) .................. 10-2001-0074382

(51) Int. Cl.
*G06F 1/12* (2006.01)
(52) U.S. Cl. .................. 713/400; 386/201; 386/208
(58) Field of Classification Search .................. 713/400; 386/201, 208
See application file for complete search history.

(56) References Cited

U.S. PATENT DOCUMENTS

| | | | |
|---|---|---|---|
| 5,119,474 A | 6/1992 | Beitel |
| 5,127,303 A | 7/1992 | Tsumura |
| 5,194,682 A | 3/1993 | Okamura |
| 5,194,683 A | 3/1993 | Tsumura |
| 5,294,982 A | 3/1994 | Salomon |
| 5,408,686 A | 4/1995 | Mankovitz |
| 5,494,443 A | 2/1996 | Nakai |
| 5,499,921 A | 3/1996 | Sone |
| 5,526,284 A | 6/1996 | Mankovitz |
| 5,583,980 A | 12/1996 | Anderson |

(Continued)

FOREIGN PATENT DOCUMENTS

JP 02-223086 9/1990

(Continued)

OTHER PUBLICATIONS

Korean Notice of Allowance dated Jun. 28, 2007 for Application No. 10-2006-0107084, with English translation, 4 pages.

(Continued)

*Primary Examiner* — Nitin Patel
(74) *Attorney, Agent, or Firm* — Fish & Richardson P.C.

(57) ABSTRACT

A recording medium, method and apparatus for managing data are discussed. According to an embodiment, the present invention provides a method of reproducing main data and additional data. The method includes receiving the additional data associated with the main data, the additional data being divided into a plurality of segment units; and reproducing the additional data in a synchronous manner with the main data using time information if indication information indicates a presence of the time information. The time information indicates a presentation time of the additional data with respect to the main data. The main data and the additional data are reproduced according to management data, the management data including link information for linking the main data and the additional data.

12 Claims, 6 Drawing Sheets

U.S. PATENT DOCUMENTS

| | | | |
|---|---|---|---|
| 5,649,234 | A | 7/1997 | Klappert |
| 5,683,253 | A | 11/1997 | Park |
| 5,701,511 | A | 12/1997 | Smith |
| 5,705,762 | A | 1/1998 | Kang |
| 5,726,373 | A | 3/1998 | Choi |
| 5,808,722 | A | 9/1998 | Suzuki |
| 5,854,619 | A | 12/1998 | Kato |
| 5,953,375 | A | 9/1999 | Nishiwaki |
| 5,960,152 | A | 9/1999 | Sawabe et al. |
| 6,006,241 | A | 12/1999 | Purnaveja |
| 6,016,295 | A | 1/2000 | Endoh |
| 6,118,608 | A | 9/2000 | Kakihara |
| 6,172,988 | B1 | 1/2001 | Tiernan |
| 6,173,113 | B1 | 1/2001 | Okada |
| 6,173,317 | B1 | 1/2001 | Chaddha |
| 6,188,662 | B1 | 2/2001 | Maeda et al. |
| 6,259,858 | B1 | 7/2001 | Ando |
| 6,263,330 | B1 | 7/2001 | Bessette |
| 6,267,600 | B1 | 7/2001 | Song |
| 6,288,990 | B1 | 9/2001 | Fujiie |
| 6,414,725 | B1 | 7/2002 | Clarin |
| 6,429,364 | B1 | 8/2002 | Muraki |
| 6,441,291 | B2 | 8/2002 | Hasegawa |
| 6,453,119 | B1 | 9/2002 | Maruyama |
| 6,467,061 | B2 | 10/2002 | Chung |
| 6,542,694 | B2 | 4/2003 | Ando |
| 6,553,182 | B2 | 4/2003 | Ando |
| 6,580,873 | B2 | 6/2003 | Ando |
| 6,584,152 | B2 | 6/2003 | Sporer |
| 6,584,274 | B2 | 6/2003 | Ando |
| 6,597,861 | B1 | 7/2003 | Tozaki |
| 6,625,388 | B2 | 9/2003 | Winter |
| 6,636,238 | B1 | 10/2003 | Amir |
| 6,654,543 | B2 | 11/2003 | Ando |
| 6,654,863 | B2 | 11/2003 | Nishio |
| 6,668,158 | B1 | 12/2003 | Tsutsui |
| 6,697,632 | B1 | 2/2004 | Sood |
| 6,788,880 | B1 | 9/2004 | Fuchigami |
| 6,802,019 | B1 | 10/2004 | Lauder |
| 6,979,769 | B1 | 12/2005 | Majima |
| 7,092,334 | B2 | 8/2006 | Choi |
| 7,181,636 | B2 | 2/2007 | Kim et al. |
| 7,293,189 | B2 | 11/2007 | Kim et al. |
| 7,587,735 | B2 | 9/2009 | Ando |
| 7,657,770 | B2 | 2/2010 | Kim et al. |
| 7,793,131 | B2 | 9/2010 | Kim et al. |
| 2001/0043525 | A1 | 11/2001 | Ito |
| 2002/0005107 | A1 | 1/2002 | Kurakake et al. |
| 2002/0006271 | A1 | 1/2002 | Winter et al. |
| 2002/0034375 | A1 | 3/2002 | Suda |
| 2002/0051081 | A1 | 5/2002 | Hori et al. |
| 2002/0072047 | A1 | 6/2002 | Michelson et al. |
| 2002/0159757 | A1 | 10/2002 | Ando et al. |
| 2003/0093790 | A1 | 5/2003 | Logan |
| 2003/0095482 | A1 | 5/2003 | Hung |
| 2003/0095794 | A1 | 5/2003 | Chung |
| 2003/0198155 | A1 | 10/2003 | Go |
| 2006/0248266 | A1 | 11/2006 | Sun et al. |

FOREIGN PATENT DOCUMENTS

| | | |
|---|---|---|
| JP | 10-501916 A | 2/1998 |
| JP | 2000-149455 A1 | 5/2000 |
| JP | 2001-202755 | 7/2001 |
| KR | 2001-0024820 | 3/2001 |
| KR | 2002-0006620 | 1/2009 |
| WO | WO 96/31880 A1 | 10/1996 |
| WO | WO 00/26911 | 5/2000 |

OTHER PUBLICATIONS

U.S. Office Action dated Oct. 28, 2010 for U.S. Appl. No. 11/409,990, 8 pages.

U.S. Office Action dated Mar. 16, 2011 for U.S. Appl. No. 11/924,664, 16 pages.

Korean Office Action dated Mar. 28, 2005, 2 pages (not in English Language).

U.S. Office Action dated May 13, 2004 for U.S. Appl. No. 10/305,027, 9 pages.

U.S. Office Action dated Oct. 25, 2004 for U.S. Appl. No. 10/305,027, 6 pages.

U.S. Office Action dated Apr. 14, 2005 for U.S. Appl. No. 10/305,027, 7 pages.

U.S. Office Action dated May 15, 2006 for U.S. Appl. No. 10/305,027, 9 pages.

U.S. Office Action dated Oct. 17, 2008 for U.S. Appl. No. 11/409,990, 18 pages.

U.S. Office Action dated May 21, 2009 for U.S. Appl. No. 11/924,658, 19 pages.

USPTO Non-Final Office Action issued in U.S. Appl. No. 11/409,990, mailed Sep. 1, 2009, 7 pages.

FIG. 4

Original Progam Chain Information
(ORG_PGCI)

| PGC General Information (PGC_GI) |
|---|
| PG Information #1 (PGC #1) |
| ⋮ |
| PG Information #m (PGC #m) |
| CI Search Pointer #1 (CI_SRP #1) |
| ⋮ |
| CI Search Pointer #n (CI_SRP #n) |
| Cell Information #1 (CI #1) |
| ⋮ |
| Cell Information #n (CI #n) |

| | |
|---|---|
| C_TY | Cell Type |
| PB_INF | Playback Information |
| AOBI_SRPN | AOBI Search Pointer Number |
| ASVUI_SRPN | ASVUI Search Pointer Number |
| ALUI_SPRN | ALUI Search Pointer Number |
| ASV_DMD | Display Mode of ASV |
| C_EPI_Ns | Number of C_EPIs |
| C_A_S_PTM | Audio Start PTM of this Cell |
| C_A_E_PTM | Audio End PTM of this Cell |

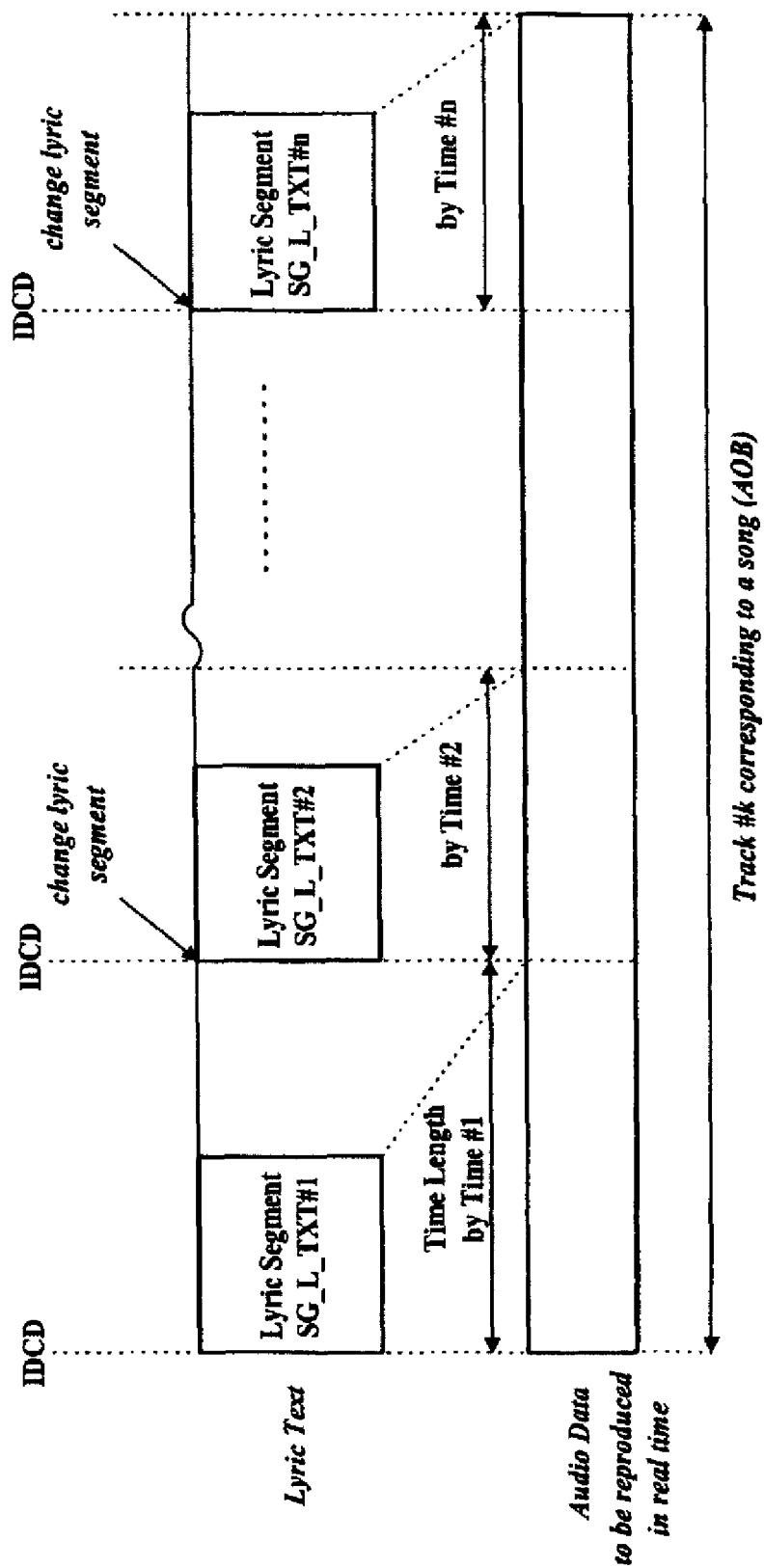

FIG. 7

*Audio Lyric File Information Table (ALFIT)*

| | | | |
|---|---|---|---|
| Audio Lyric File Information (ALFI) | Audio Lyric FIT Information (ALFITI) | ALFI_Ns | Number of ALFIs |
| | | AL_I_Ns | Number of AL_Is |
| | | ALFIT_EA | End Address of ALFIT |
| | ALFI General Information (ALFI_GI) | CHRS | Charater Set |
| | | ALUI_SRP_Ns | Number of ALUI_SRPs |
| | | ALU_MG_EA | End Address of ALU_MG |
| | ALUI Search Pointer #1 (ALUI_SRP #1) | ALU_SA | Start Address of ALU |
| | | ALU_SZ | Size of ALU |
| | | L_ATR | Lyric Attribute |
| | ALUI Search Pointer #2 (ALUI_SRP #2) | ALU_SA | Start Address of ALU |
| | | ALU_SZ | Size of ALU |
| | | L_ATR | Lyric Attribute |
| | ⋮ | ⋮ | ⋮ |
| | ALUI Search Pointer #n (ALUI_SRP #n) | ALUI_SA | Start Address of ALU |
| | | ALUI_SZ | Size of ALU |
| | | L_ATR | Lyric Attribute |

*file of 'AR_Lyric.ARO'*

| | | | | | | | |
|---|---|---|---|---|---|---|---|
| ALU #1 (ALU #1) | IDCD | Time #1 | SG_L_TXT#1 | ···· | IDCD | Time# k | SG_L_TXT#k |
| ALU #2 (ALU #2) | IDCD | Time #1 | SG_L_TXT#1 | ···· | IDCD | Time# p | SG_L_TXT#p |
| ⋮ | ⋮ | ⋮ | ⋮ | ⋮ | ⋮ | ⋮ | ⋮ |
| ALU #n (ALU #n) | IDCD | Time #1 | SG_L_TXT#1 | ···· | IDCD | Time# s | SG_L_TXT#s |

METHOD FOR ENSURING SYNCHRONOUS PRESENTATION OF ADDITIONAL DATA WITH AUDIO DATA

CROSS-REFERENCE TO RELATED APPLICATIONS

This application is a continuation of U.S. application Ser. No. 11/924,656, filed on Oct. 26, 2007, now pending, which is a continuation of U.S. application Ser. No. 11/593,082, filed on Nov. 6, 2006, now U.S. Pat. No. 7,293,189, which is a continuation of U.S. application Ser. No. 10/305,020, filed on Nov. 27, 2002, now U.S. Pat. No. 7,181,636, which claims the benefit of a foreign priority application filed in KOREA on Nov. 27, 2001, as Serial No. 10-2001-0074382. This application claims priority to all of these applications, and all of these applications are incorporated by reference.

BACKGROUND OF THE INVENTION

1. Field of the Invention

The present invention relates to a method of recording additional data such as lyric and user input data to be in synchronization with audio data on a rewritable recording medium, and of reproducing them synchronously therefrom.

2. Description of the Related Art

A disk-type recording medium such as a Compact Disk (CD) can store high-quality digital audio data permanently, so that it is very popular recording medium in these days.

Recently, a Digital Versatile Disk (called 'DVD' hereinafter) has been developed as a new disk-type recording medium. A DVD can store much more data than a CD, that is, high-quality moving pictures or audio data are recorded on a DVD for much longer time. Therefore, a DVD will be used widely in the near future.

There are three types of DVDs—DVD-ROM for read-only, DVD-R for write-once, and DVD-RAM or DVD-RW for rewritable. For a rewritable DVD, the standardization of data writing format is in progress.

FIG. 1 is a block diagram of an optical disk device that records/reproduces audio data to/from a recording medium.

The disk device configured as FIG. 1 comprises an optical pickup 11 reading signals recorded on a rewritable DVD 10 such as a DVD-RW and writing data streams processed into writable signals onto the rewritable DVD 10; a reproduced signal processor 12 restoring the read signals into compressed digital data; a decoder 13 decoding the compressed digital data to original data; a sampler 18 digitizing an inputted analog signal at a preset sampling rate; an encoder 17 encoding the digitized LPCM data into MPEG-, or AC3-formatted data; a writing processor 16 converting the encoded data from the encoder 17 or LPCM data from the sampler 18 into signals suitable to be written; a controller 14 controlling all elements to conduct user's commands such as playback or record; and a memory 15 for storing data temporally.

If an analog signal is applied to the disk device of FIG. 1, the sampler 18 samples the analog signal at the preset sampling rate. Each sampled signal, which is LPCM data, is applied to the encoder 17 that encodes a block of sampled data into compressed data of pre-specified format, for example, MPEG format. The compressed data are then applied to the writing processor 16.

The writing processor 16 converts a series of the compressed data into binary signals which are written in mark/space patterns on the writable DVD 10. Already-compressed digital data from outside are directly processed by the writing processor 16 to be written onto the writable DVD 10.

After recording of audio data, navigation data for the audio data are created and then recorded on the writable DVD 10.

FIG. 2 shows the structure of RTR_AMG (Real Time Record Audio ManaGement) recorded as navigation data on a rewritable disk. The RTR_AMG includes RTR_AMGI (RTR Audio Manager General Information), AUDFIT (AUDio File Information Table), ASVFIT (Audio Still Video File Information Table), ORG_PGCI (ORGiginal PGC (ProGram Chain) Information), UD_PGCIT (User Defined PGC Information Table), TXTDT_MG (TeXT DaTa ManaGer), and MNFIT (MaNufacturer's Information Table).

The TXTDT_MG can include additional data of recorded songs such as lyrics. Therefore, when the controller 14 selects and reproduces a recorded song from the rewritable disk 10, it is able to present lyric text in characters on a screen by reading it from the TXTDT_MG.

Consequently, when a user selects a recorded song to play back from the rewritable DVD 10, he or she is able to view its lyric on a screen.

However, each of additional data such as a lyric included in the TXTDT_MG is linked with a recorded song wholly. In other words, a lyric in the TXTDT_MG cannot have information to synchronize in detail with a recorded song. Therefore, it is impossible to display lyric data step by step at the same speed that the recorded song is reproduced from a rewritable DVD.

SUMMARY OF THE INVENTION

It is an object of the present invention to provide a synchronizing method that records additional data such as lyric data and user input data to be synchronized minutely with audio data on a rewritable recording medium.

It is another object of the present invention to provide a synchronizing method that reproduces synchronously audio data and additional data thereof that have been recorded with minutely-synchronizing information.

It is another object of the present invention to provide a method and apparatus for providing data structures that allow a synchronous reproduction of main data and additional data, which address the limitations and disadvantages associated with the related art.

An audio data related information recording method in accordance with an aspect of the present invention segments additional information related with audio data recorded on a rewritable recording medium, records the information segments, and further records synchronizing information, e.g., time length to keep up presentation of each information segment or start time to present each information segment, in the vicinity of said each information segment in order to present each information segment in synchronization with a corresponding part of the recorded audio data.

An audio data related information reproducing method in accordance with an aspect of the present invention reads sequentially a plurality of information segments constituting a piece of additional information related with audio data recorded on a rewritable recording medium, and makes presentation of each information segment based on synchronizing information, e.g., time length to keep up presentation of each information segment or start time to present each information segment, recorded in association with each information segment in order to present each information segment in synchronization with a corresponding part of the recorded audio data.

According to an aspect of the present invention, there is provided a method of reproducing main data and additional data, the method comprising: receiving the additional data associated with the main data, the additional data being divided into a plurality of segment units; and reproducing the additional data in a synchronous manner with the main data using time information if indication information indicates a presence of the time information, wherein the time information indicates a presentation time of the additional data with respect to the main data, and wherein the main data and the additional data are reproduced according to management data, the management data including link information for linking the main data and the additional data.

According to another aspect of the present invention, there is provided a method of reproducing main data and additional data, the method comprising: providing the additional data associated with the main data, the additional data being divided into a plurality of segment units; and reproducing the additional data in a synchronous manner to the main data using time information if indication information indicates a presence of the time information, wherein the time information is present only if the indication information indicates that the time information is present, wherein the main data and the additional data are reproduced according to link information for linking the main data and the additional data, and wherein the link information is separated stored from the main data and the additional data.

According to another aspect of the present invention, there is provided a method of providing additional data to be reproduced with main data, the method comprising: providing the additional data associated with the main data, the additional data being divided into a plurality of segment units and capable of being reproduced with the main data in a synchronous manner; and providing management data associated with the additional data, wherein the management information includes link information for linking the main data and the additional data, time information for reproducing the additional data with the main data in the synchronous manner, and attribute information for providing at least one attribute of the additional data.

According to another aspect of the present invention, there is provided a method of providing additional data to be reproduced with main data, the method comprising: providing the additional data associated with the main data, the additional data being divided into a plurality of segment units and capable of being reproduced with the main data in a synchronous manner; and providing management data associated with the additional data, wherein the management information includes time information and indication information indicating a presence of the time information, the time information being present only if the indicating information indicates the time information is present, wherein the management information further includes linking information for linking the main data and the additional data, and wherein the additional data is provided separately from the main data.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 4 shows CI (Cell Information) structured according to an embodiment of the present invention;

FIG. 5 illustrates an example of a continuous and synchronous display of a series of lyric segments together with reproduced audio data audio according to an embodiment of the present invention;

FIG. 7 shows ALFIT (Audio Lyric File Information Table) structured according to another embodiment of the present invention.

DETAILED DESCRIPTION OF THE PREFERRED EMBODIMENTS

In order that the invention may be fully understood, preferred embodiments thereof will now be described with reference to the accompanying drawings.

In an audio data recording method in accordance with an embodiment of the present invention, lyric or user data related with a song recorded on a rewritable disk such as DVD-RW is segmented into several units. Each segmented unit is linked with each corresponding part of the recorded song through segment synchronizing information for the purpose of minute synchronization of song and additional data.

Figure 1:
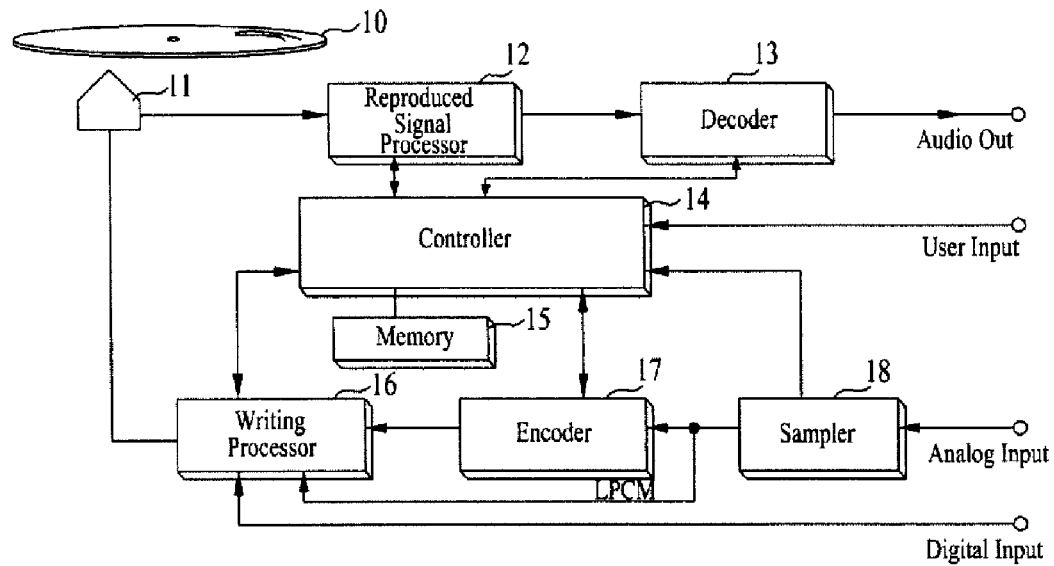
FIG. 1 is a block diagram of an optical disk device that records/reproduces audio data to/from a recording medium according to a related art.
Figure 2:
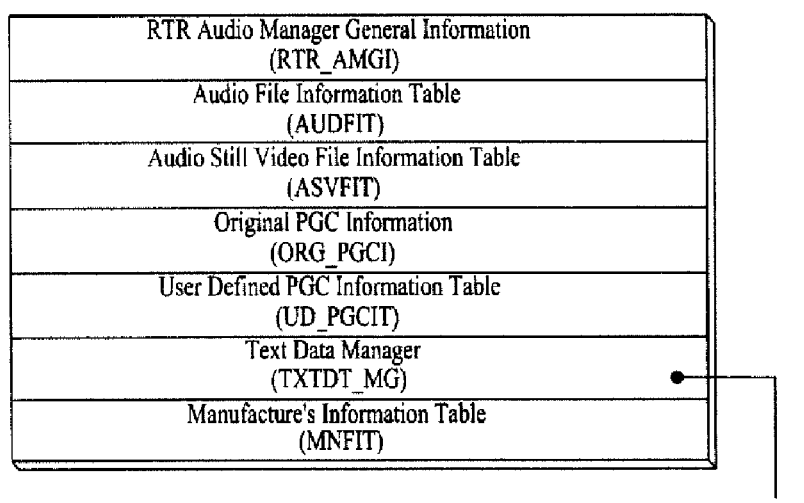
FIG. 2 shows the structure of RTR_AMG (Real Time Record Audio ManaGement) recorded as navigation data on a rewritable disk according to a related art.
Figure 3:
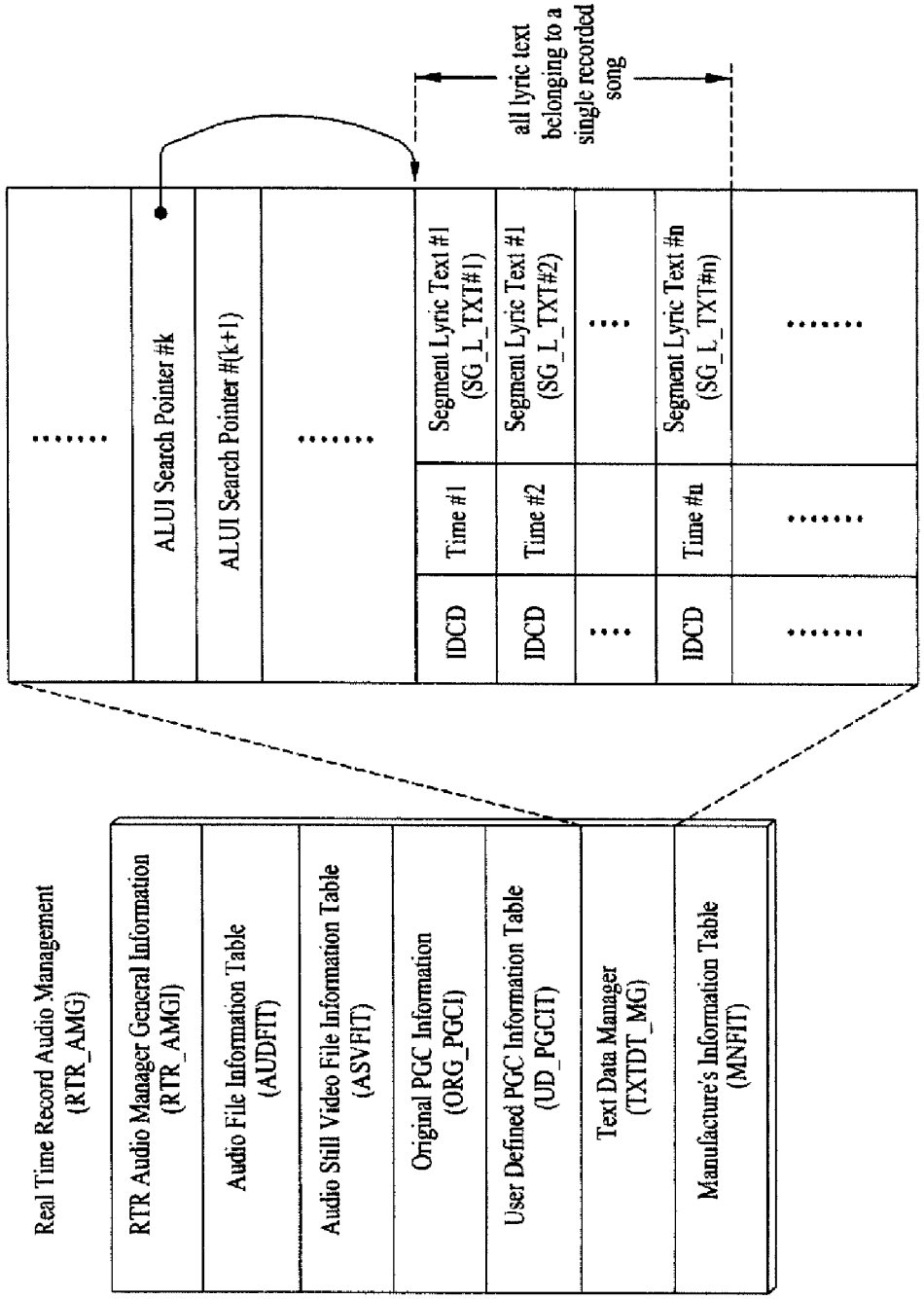
FIG. 3 shows an RTR_AMG in which TXTDT_MG (TeXT DaTa ManaGer) structured according to an embodiment of the present invention.

FIG. 3 shows an RTR_AMG in which TXTDT_MG structured according to an embodiment of the present invention is included.

As shown in FIG. 3, RTR_AMG is composed of RTR_AMGI, AUDFIT, ASVFIT, ORG_PGCI, UD_PGCIT, TXTDT_MG, and MNFIT. The TXTDT_MG in FIG. 3 is composed of respective ALUI (Audio Lyric Unit Information) search pointers and corresponding pieces of ALUI. Each ALUI includes lyric segments 'SG_L_TXT #i', which is segmented lyric text, and their individual output-time related information 'Time #i'.

The output-time related information 'Time #i' is time-length, which a corresponding lyric segment is kept displayed for, or instant time when a corresponding lyric segment starts to be displayed. The lyric text may be displayed as subtitles. This time information is also used to differentiate a linked lyric segment from several lyric segments displayed altogether by different color or font for a specified duration.

Each lyric segment includes an ID code 'IDCD' as shown in FIG. 3. The ID code is used to indicate that each segmented unit has output-time related information, that each segmented unit includes lyric or user data, or that the output-time related information is duration or start time.

Each group of segmented units is linked with a recorded song through each ALUI search pointer in TXTDT_MG as shown in FIG. 3. For example, an ALUI search pointer linked with a recorded song points a start position of the first lyric segment of an associated segment group.

To link a recorded song with an ALUI search pointer, a piece of CI (Cell Information) related with an AOB (Audio OBject), which corresponds to a single recorded song in general, is structured in the ORG_PGCI as shown in FIG. 4.

Each CI includes an AOBI_SRPN (AOB Information SeaRch Pointer Number) for indexing information location of a related AOB (or song), an ASVUI_SRNP (ASVU (Audio Still Video Unit) Information SeaRch Pointer Number) for indexing information location of still video data linked with an AOB, and an ALUI search pointer number 'ALUI_SRPN' for indexing an ALUI search pointer in the TXTDT_MG that points a segment group containing a full lyric text related with an AOB.

Thus, if a song, namely, an AOB is chosen, the controller 14 reads the number written in ALUI_SPRN of CI associated with the selected AOB, and reads an address in ALUI search pointer indexed by the read number in the TXTDT_MG. The location of lyric text related with the selected song is found by this read address.

Then, lyric segments are retrieved sequentially from the addressed location by the reproduced signal processor 12. At this time, the controller 14 examines an ID code preceding each lyric segment. If the ID code is indicative of type of output-time related information, e.g., a time length for which the following lyric segment 'SG_L_TXT #i' is displayed, the controller 14 keeps outputting each lyric segment for a duration specified by the time length and changes current lyric segment with the next one after the time length expires. This operation continues until the end of AOB or stop request is received.

FIG. 5 illustrates continuous and synchronous display of a series of lyric segments together with reproduced audio data belonging to the selected AOB.

Referring to FIG. 5, if the ID code is indicative of presentation start time of each lyric segment, the controller 14 outputs each lyric segment the moment an elapsed time after reproducing the chosen AOB (or song) becomes equal to the start time specified by field 'Time'. The currently-outputted lyric segment keeps being outputted until the next segment is outputted at its start time.

If the ID code is indicative of not the type of output-time related information but the type of additional information, e.g., user data, the controller 14 processes the segmented additional information adequately for the designated type.

If the ID code indicates that there is no output-time related information in lyric segments, then the lyric segments are sequentially read out irrespective of time. This operation seems to correspond to a conventional lyric data displaying method.

Figure 6:
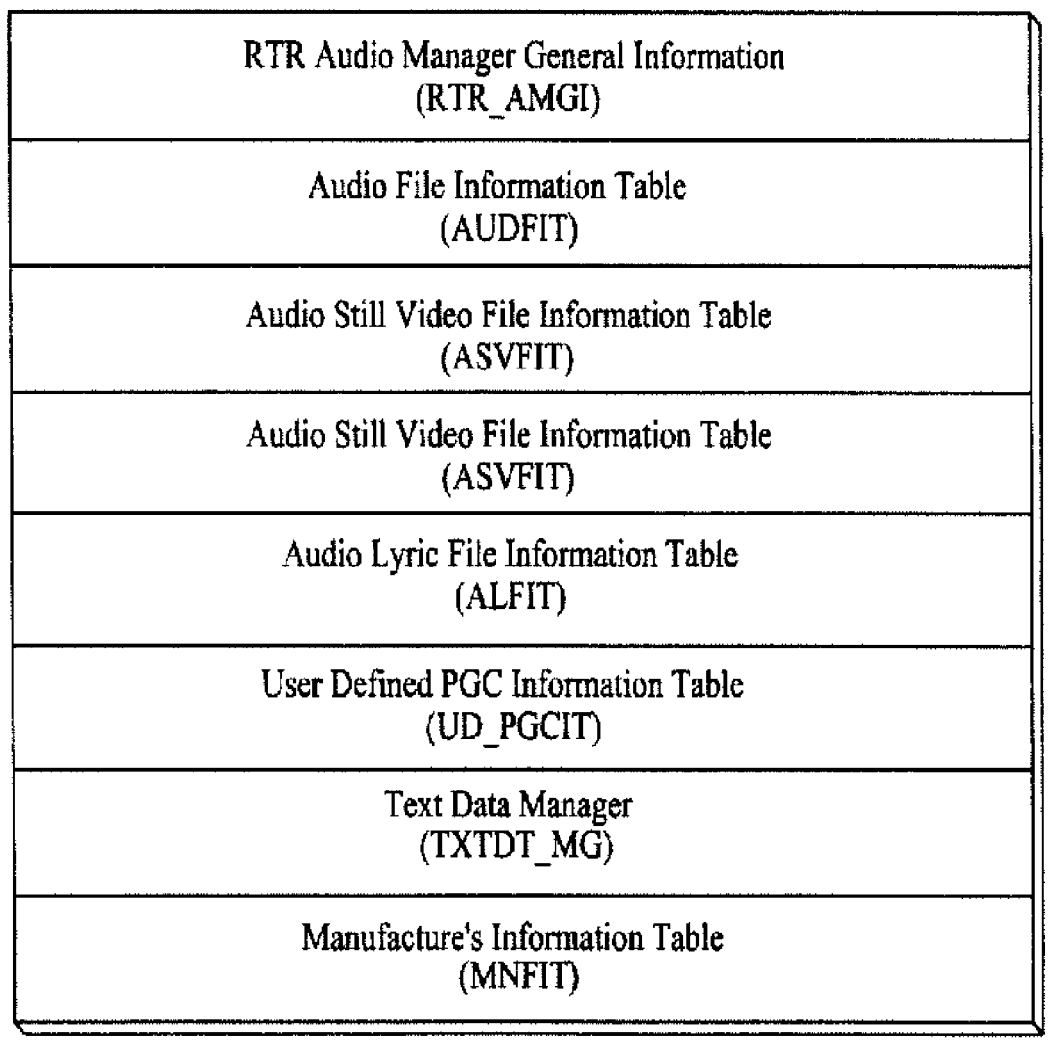
FIG. 6 shows an RTR_AMG structured according to another embodiment of the present invention.

The lyric segments related with a recorded song may be written in a file other than the RTR_AMG, instead of the TXTDT_MG FIG. 6 shows an RTR_AMG structure according to another embodiment of the present invention. The RTR_AMG of FIG. 6 includes an ALFIT (Audio Lyric File Information Table) for storing in another file the lyric data that are composed of segmented information such as lyrics or user data of all recorded songs.

FIG. 7 shows the structure of the ALFIT of FIG. 6. The ALFIT is composed of ALFITI (ALFIT Information) and ALFI. The ALFITI includes fields of 'ALFI_Ns' reserved for the number of audio lyric information files, 'AL_I_Ns' for the number of pieces of audio lyric information, and 'ALFIT_EA' for an end address of ALFIT.

The ALFI is composed of ALFI_GI (ALFI General Information) and a plurality of ALUI (Audio Lyric Unit Information) search pointers, each including 'ALU_SA' for a start address of a lyric unit, 'ALU_SZ' for size of a lyric unit, and 'L_ATR' for attribute of a lyric.

The ALU_SA in each ALUI search pointer points to the location of a corresponding ALU (Audio Lyric Unit) in a lyric file named by 'AR_Lyric.ARO' that is not included in the RTR_AMG. Each ALU in the lyric file 'AR_Lyric.ARO' includes a lyric text associated with a single recorded song, and the lyric text is divided into several segments 'SG_L_TXT #i'. Each lyric segment also has output-time related information 'Time' and ID code 'IDCD as described in the aforementioned embodiment.

According to this structure of the RTR_AMG, the ALUI_search pointer number contained in CI indexes an ALUI search pointer pointing to a lyric unit in the file 'AR_Lyric.ARO' associated with a recorded AOB, namely a song.

Thus, if a song, namely, an AOB is chosen, the controller 14 reads the number written in ALUI_SPRN of CI associated with the selected AOB, and reads an address in ALUI search pointer contained in the field 'ALFI' indexed by the read number. The location of a lyric unit related with the selected song is found in the file 'AR_Lyric.ARO' by this read address.

Then, lyric segments are retrieved sequentially from the first segment 'SG_L_TXT #1' at the addressed location in the file 'AR_Lyric.ARO' by the reproduced signal processor 12. At this time, the controller 14 examines an ID code preceding each lyric segment.

If the ID code is indicative of the type of output-time related information, the controller 14 conducts continuous and synchronous display of a series of lyric segments together with reproduced audio data belonging to the selected AOB. In this lyric synchronous display operation, a just-displayed lyric segment can be differentiated by color or font from neighboring lyric segments displayed altogether.

The above-explained lyric data synchronizing method ensures minutely-synchronous lyric presentation with audio data, e.g., song being reproduced in real time from a rewritable recording medium. Thus, a user is able to enjoy a reproduced song better through the lyric text displayed in synchronization with the song.

The detailed description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. An apparatus comprising:
   an obtaining unit that obtains a signal that includes content data, navigation data, and text data;
   a decoder that decodes the obtained signal;
   an outputting unit that outputs the decoded signal; and
   a controller that:
      retrieves, via the obtaining unit, content data and navigation data, the navigation data including link information and management information, each corresponding to the retrieved content data, the retrieved management information including indication information indicating whether the management information includes time information associated with a mapping time of each text segment, the mapping time of a text segment defining a mapping relationship between the content data and the text segment,
      decodes, via the decoder, the retrieved link information and the retrieved management information,
      retrieves, via the obtaining unit, text data corresponding to the retrieved content data using the decoded link information and the decoded management information, the text data being divided into one or more text segments, decodes, via the decoder, the retrieved content data and the retrieved text data, and outputs, via the outputting unit, the decoded content data and the decoded text data using the link information, the time information being used to synchronize output of the decoded content data with the decoded text data when the time information is determined to have been included in the navigation data.

2. The apparatus of claim 1, wherein the controller further determines a duration time of a current text segment using a first presentation time of the current text segment and a second presentation time of a next text segment.

3. The apparatus of claim 1, wherein the outputting unit includes a display unit.

4. The apparatus of claim 1, wherein one or more of the text segments retrieved by the obtaining unit correspond to one or more specific parts of the content data.

5. The apparatus of claim 4, wherein the controller further determines correspondences between the one or more of the text segments and the one or more specific parts of the content data using presentation times assigned to the one or more text segments by the time information.

6. The apparatus of claim 5, wherein the controller further selects a specific part of the content data, and outputs, via the display unit and using the time information, a specific text segment corresponding to the selected specific part of the content data.

7. The apparatus of claim 1, wherein the controller further assigns color information to each text segment.

8. A method performed by an electronic device and comprising:

obtaining content data and navigation data, the navigation data including link information and management information, each corresponding to the retrieved content data, the retrieved management information including indication information indicating whether the management information includes time information associated with a mapping time of each text segment, the mapping time of a text segment defining a mapping relationship between the content data and the text segment;

decoding the retrieved link information and the retrieved management information;

obtaining text data corresponding to the retrieved content data using the decoded link information and the decoded management information, the text data being divided into one or more text segments;

decoding the retrieved content data and the retrieved text data; and outputting, by the electronic device, the decoded content data and the decoded text data using the link information, the time information being used to synchronize output of the decoded content data with the decoded text data when the time information is determined to have been included in the navigation data.

9. The method of claim 8, wherein a duration time of a current outputted text segment is determined using a first presentation time of the current text segment and a second presentation time of a next text segment.

10. The method of claim 8, wherein one or more of the retrieved text segments correspond to one or more specific parts of the content data.

11. The method of claim 10, wherein the correspondences between the one or more of the text segments and the one or more specific parts of the content data are determined using presentation times assigned to the one or more text segments by the time information.

12. An apparatus comprising:

means for obtaining content data and navigation data, the navigation data including link information and management information, each corresponding to the retrieved content data, the retrieved management information including indication information indicating whether the management information includes time information associated with a mapping time of each text segment, the mapping time of a text segment defining a mapping relationship between the content data and the text segment;

means for decoding the retrieved link information and the retrieved management information;

means for obtaining text data corresponding to the retrieved content data using the decoded link information and the decoded management information, the text data being divided into one or more text segments;

means for decoding the retrieved content data and the retrieved text data; and means for outputting the decoded content data and the decoded text data using the link information, the time information being used to synchronize output of the decoded content data with the decoded text data when the time information is determined to have been included in the navigation data.

\* \* \* \* \*